(12) United States Patent
Ameline (10) Patent No.: US 8,441,491 B2
(45) Date of Patent: May 14, 2013

(54) METHOD FOR PERFORMING UNDO AND REDO OPERATIONS ON A GRAPHICS PROCESSING UNIT

(75) Inventor: Ian Ameline, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 699 days.

(21) Appl. No.: 12/176,284

(22) Filed: Jul. 18, 2008

(65) Prior Publication Data

US 2010/0013843 A1    Jan. 21, 2010

(51) Int. Cl.
*G06T 1/00* (2006.01)
*G06T 15/00* (2011.01)
*G09G 5/00* (2006.01)
*G06K 9/40* (2006.01)

(52) U.S. Cl.
USPC ............................. 345/522; 345/683; 382/254

(58) Field of Classification Search .................. 345/522, 345/683
See application file for complete search history.

(56) References Cited

U.S. PATENT DOCUMENTS

| | | | | |
|---|---|---|---|---|
| 5,838,333 A | * | 11/1998 | Matsuo | 345/604 |
| 7,313,285 B2 | * | 12/2007 | Aliaga et al. | 382/243 |
| 7,391,444 B1 | * | 6/2008 | Nomura et al. | 348/239 |
| 7,747,814 B2 | * | 6/2010 | Green | 711/104 |
| 7,813,577 B2 | * | 10/2010 | Kotani et al. | 382/254 |
| 7,903,119 B2 | * | 3/2011 | Hochmuth et al. | 345/522 |
| 2007/0172118 A1 | * | 7/2007 | Pan | 382/162 |

* cited by examiner

*Primary Examiner* — Ke Xiao
*Assistant Examiner* — Jed-Justin Imperial
(74) *Attorney, Agent, or Firm* — Patterson & Sheridan, LLP (57) ABSTRACT

One embodiment of the present invention sets forth a technique for performing undo operations on a graphics processing unit. The graphics processing unit is configured to copy a current buffer prior to performing modifications to the current buffer. The copy of the buffer is subtracted from the modified current buffer to generate a difference buffer. An undo operation is performed by subtracting the difference buffer from the modified current buffer. A sequence of difference buffers may be generated to provide multiple undo levels. Adding a subsequent difference buffers to the current buffer, generated by performing an undo operation, has the effect of performing a redo operation. The difference buffers are compressed for efficient storage and transmission between memory local to the graphics processing unit and system memory.

22 Claims, 7 Drawing Sheets

METHOD FOR PERFORMING UNDO AND REDO OPERATIONS ON A GRAPHICS PROCESSING UNIT

BACKGROUND OF THE INVENTION

1. Field of the Invention

Embodiments of the present invention relate generally to performing computations on a graphics processing unit and more specifically to a method for performing undo and redo operations on a graphics processing unit.

2. Description of the Related Art

Software graphics applications commonly include a user interface that allows a user to perform selected operations on graphics objects managed by the software graphics application. One example of a software graphics application is a drawing program, which allows a user to create and modify graphics objects using one or more drawing tools provided by the drawing program. In a typical usage scenario, the user creates an image by invoking various drawing tools, such as a paintbrush, a pencil, and an eraser, each with an associated action. Each action performed by a drawing tool may modify the image and the underlying application data that represents the image. For example, the user may add a brush stroke to the image using a paintbrush tool, which modifies the application data to add the brush stroke. Oftentimes, the user may wish to discard one or more previously performed actions to, for example, undo mistakes or to aesthetically improve on previously performed actions. To facilitate discarding previously performed actions, software graphics applications conventionally provide an undo operation that allows the user to undo one or more actions. A related redo operation allows the user to re-perform an action discarded using the undo operation.

An undo operation may be conventionally performed by copying and maintaining sequential versions of application data in response to actions that modify the current application data. In some implementations of an undo operation, a complete copy of each version of the application data may be instantiated to accommodate each action, thereby enabling a corresponding undo operation. For example, a drawing program may maintain sequential copies of an entire image being modified by the user in a given action. However, instantiating a complete copy of the application data can be quite time consuming and may require a significant amount of memory. A more efficient implementation instantiates only the portion of the application data that is actually modified in a given action. For example, the drawing program may divide the image into tiles and only save modified copies of those tiles modified by the action. Each sequential version of the application data is represented by a set of references to the tiles. When a given tile is modified, only the data for that tile needs to be copied and modified, and the reference to the tile is set to refer to the modified tile. This technique may treat each tile as a reference-counted object, using a set of reference counters to facilitate the copy on write mechanism.

Certain software graphics applications are structured to partition computational work over multiple threads, where some threads execute on a central processing unit (CPU) and other threads execute on a graphics processing unit (GPU). One common structure of a software graphics application, referred to herein as a "GPU enabled application," incorporates CPU threads configured to implement a user interface as well as perform overall application management, and GPU threads configured to perform graphics operations under the control of the CPU threads. Inter process communication between a CPU thread and a GPU thread is typically performed via a system interconnect, such as the industry standard PCI-express. For the software graphics application to fully accommodate undo operations, multiple versions of the application data need to be kept, including data generated by the GPU threads. However, GPUs conventionally do not provide sufficient flexibility to implement sophisticated data management techniques, such as copy on write, which may be used to increase the efficiency and performance of undo and redo operations. Furthermore, GPU systems typically do not include sufficient extra memory resources to allow complete instantiation of multiple versions of application data stored within local GPU memory. Storing versions of application data generated by the GPU in system memory is problematic because the system interconnect bridging the GPU to system memory typically becomes or aggravates a performance bottleneck, which diminishes overall system performance. In each scenario, conventional techniques for facilitating undo operations on data generated by the GPU are limited by the limited resources and flexibility of the GPU.

As the foregoing illustrates, what is needed in the art is a technique for efficiently facilitating undo operations in GPU enabled applications.

SUMMARY OF THE INVENTION

One embodiment of the present invention sets forth a method for generating a compressed difference buffer. The method includes the steps of copying a first buffer to a second buffer, modifying the first buffer to generate a modified first buffer, subtracting the second buffer from the modified first buffer to generate a difference buffer, compressing the difference buffer to generate a compressed difference buffer, and storing the compressed difference buffer.

One advantage of the disclosed method is that it may be used to provide undo and redo for GPU accelerated image editing operations, making efficient use of the very large GPU memory bandwidth, the parallel nature of GPU computations, and the limited bandwidth between the GPU and other elements within the system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Many graphics applications operate on various forms of buffers. For the purpose of discussion herein, a buffer is a region of memory comprising one or more data elements. Each data element may comprise one or more components, which may comprise an arbitrary structure. For example, a buffer may include a data element that is a pixel, and the pixel may include four components, consisting of an alpha, red, green, and blue color channels. A different buffer may include a vertex, comprising two or more components.

A mathematical operation on a buffer should be applied to each element of the buffer. For elements comprising more than one component ("composite" elements), the mathematical operation should be applied to each component. When a mathematical operation is applied to two buffers, the mathematical operation is independently applied to each corresponding element of the two buffers, which should be of identical size and structure. If the two buffers include composite elements, the mathematical operation is applied to corresponding components of corresponding elements between the two buffers. For example, in a scenario wherein two buffers comprising four pixels each are added together to generate a third buffer, each of the four components (alpha, red, green, and blue) of each of the four pixels residing in the first buffer are independently added to corresponding components of the four pixels residing in the second buffer. The resulting independent sum values are stored in corresponding locations within the third buffer. One sum value is generated per component of each element in the third buffer, for a total of sixteen sum values.

Figure 1:
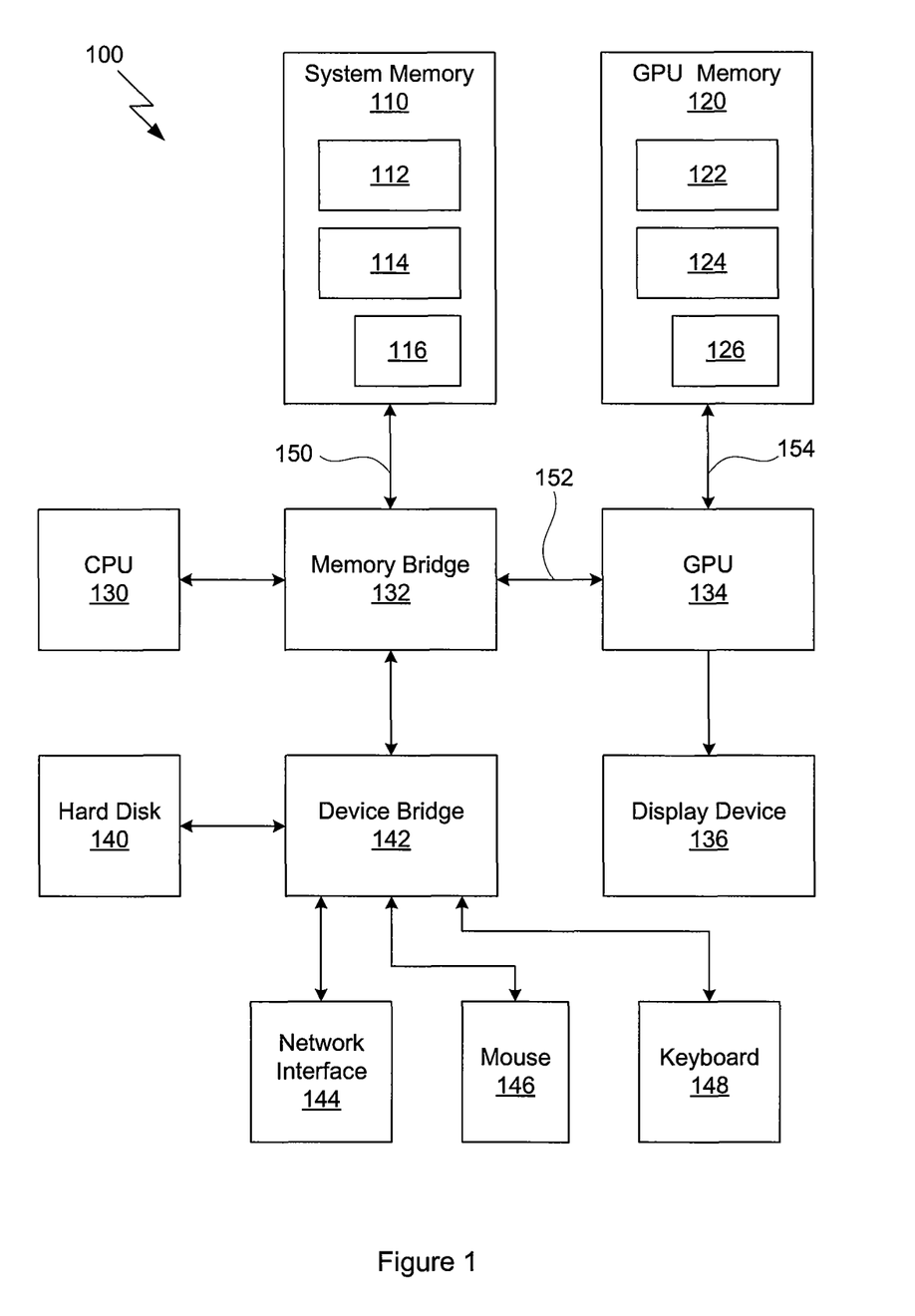
FIG. 1 is a block diagram illustrating a computer system configured to implement one or more aspects of the present invention.

FIG. 1 is a block diagram illustrating a computer system 100 configured to implement one or more aspects of the present invention. The computer system 100 includes, without limitation, a system memory 110, a graphics processing unit (GPU) memory 120, a central processing unit (CPU) 130, a memory bridge 132, a GPU 134, a display device 136, a hard disk 140, a device bridge 142, a network interface 144, a mouse 146, and a keyboard 146.

The CPU 130 communicates with the system memory 110 via the memory bridge 132, which may be, e.g., a Northbridge device or subsystem. System memory 110 is configured to store application programs, as well as data used by or generated by the CPU 130. System memory 110 is coupled to the memory bridge 132 using a system memory bus 150. The memory bridge 132 is coupled to the GPU 134 using a GPU system bus 152. In one embodiment, the GPU system bus 152 comprises a well known personal computer interconnect (PCI) express bus. The memory bridge is also coupled to the device bridge 142 using an interconnect system such as the well known interconnect PCI. The GPU 134 renders and delivers pixel data to the display device 136, such as a conventional CRT or LCD based monitor. The GPU 134 is configured to execute parallel programs, commonly referred to as shaders, using a parallel thread execution regime. The GPU 134 is coupled to the GPU memory 120 using a GPU memory bus 154. The GPU memory 120 is configured to store shader programs, as well as data, such as images, used by or generated by the GPU 134. Data stored within the GPU memory 120 passes through the GPU 134 and the memory bridge 132 when accessed by the CPU 130. In some embodiments, the integrated circuit implementing the CPU 130 may incorporate additional functional blocks, such as the memory bridge 132 and the device bridge 142. In alternative embodiments, the integrated circuit implementing the GPU 134 may incorporate additional functional blocks, such as the memory bridge 132 and the device bridge 142.

The device bridge 142 is coupled to a hard drive 140, a network interface 144, a mouse 146, and a keyboard 148. The hard drive 140 provides mass storage of programs and data. The network interface 144 provides network connectivity to other computers using a local area network (LAN) interface using any suitable technology, such as Ethernet. The mouse 146 and keyboard 148 provide user input. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, Quick Path Interconnect, or any other bus or point-to-point communication protocol(s), and connections between different devices may use different protocols as is known in the art.

In a typical configuration of computer system 100, bandwidth available through the GPU memory bus 154 is significantly greater than bandwidth available through the system memory bus 150. Furthermore, the GPU system bus 152 generally provides less bandwidth than then system memory bus 150. As a result, computations performed by the GPU 134 on data stored in GPU memory 120 are significantly more efficient than computations performed by the GPU 134 on data stored in system memory 110. In contrast, computations performed by the CPU 130 on data stored in system memory 110 tend to be relatively efficient because the CPU 130 typically executes fewer threads than the GPU 134, and therefore offers significantly less bandwidth load than the GPU 134. As described herein, the invention overcomes bandwidth limitations in the system memory bus 150 and GPU system bus 152.

In one embodiment, system memory 110 is configured to store a software graphics application 112, an undo record 114, and a compressed difference image 116. The GPU memory 120 is configured to store at least two image buffers, image buffer A 122 and image buffer B 124. The GPU memory 120 is also configured to store a compressed difference image 126. The software graphics application 112 may be configured to manage the undo record 114, as well as the compressed difference image 116. Alternately, the software graphic application 112 may call library functions to manage the undo record 114 and compressed difference image 116. In one embodiment, the software graphics application 112 provides the user with a graphical user interface (GUI), which receives user input events via the mouse 146, keyboard 148, and any other technically feasible input device. The software graphics application 112 is configured to interact with the GPU 134, which is configured to render output images for storage or display on the display device 136. The user may generate actions through any means, as specified by the software graphics application 112. For example, the user may use the mouse 146 to generate a paintbrush stroke action on an image being edited by the user. The 2D image may substantially comprise the entire scene being modified by the user or the 2D image may be a texture mapped onto an object within an overall three-dimensional (3D) scene.

For each action taken by the user that modifies a two-dimensional (2D) image, the GPU 134 copies the image buffer A 122 to image buffer B 124 and subsequently performs the action within image buffer A 122. The GPU then subtracts image buffer B 124 from image buffer A 122 to generate a difference image. Subtracting image buffers is performed by subtracting the magnitude of each color channel of each pixel for every pixel in the two image buffers. To properly perform a subtraction operation between image buffer A 122 and image buffer B 124, both image buffers should be of the same resolution and color representation (or "pixel depth"). In one embodiment, the resulting difference image is stored in image buffer B 124. The compressed difference image 126 is generated by compressing the difference image using any technically feasible technique suitable for execution on the GPU 134. In one embodiment, the compressed difference image 126 is generated using run-length encoding, a compression technique that many GPUs are equipped to perform. In a refinement of this embodiment, each region, such as a scan line, within the difference image is assigned to one or more threads within the GPU 134 for processing. For example, an image comprising 1024 scan lines may be assigned to 1024 simultaneously executing threads to perform run-length encoding and compression.

Because each action performed by the user only impacts a relatively small number of pixels in the overall image being modified, the compressed difference image 126 typically requires a fraction of the data residing in image buffer A 122, making the transmission of the compressed difference image 126 to system memory 110 relatively efficient. While generating the compressed difference image 126 may be computationally intense, a typical GPU 134 is well equipped to perform the required computations. As such, the time needed for the GPU 134 to perform the required computations and transmit the compressed difference image 126 to system memory 110 is typically less than the time needed to transmit the contents of image buffer A 122 to system memory 110.

In one embodiment, the compressed difference image 126 is transmitted to system memory for storage as compressed difference image 116. The software graphics application 112 maintains an undo record 114, which tracks levels of undo and uses sequential versions of the compressed difference image 116 to perform undo operations. The software graphics application 112 may use the same mechanism to perform redo operations. In an alternative embodiment, versions of the compressed difference image 126 are stored within GPU memory 120 and only a reference to each version of the compressed difference engine 126 is transmitted to system memory 110.

To perform an undo operation, the appropriate version of the compressed difference image 126 may be decompressed into image buffer B 124 and subtracted from image buffer A 122. For example, to discard the most recent action performed by the user using the undo operation, the most recent compressed difference image 126 may be decompressed and subtracted from image buffer A 122. To perform a redo operation, the appropriate version of the compressed difference image 126 may be decompressed and added to image buffer A 122. In one embodiment, one or more versions of compressed difference images may be stored in system memory in the undo record 114 and retrieved for processing in response to a command by the user. Each sequential undo or redo command causes the software graphics application 112 to retrieve an appropriate compressed difference image 116, which is transmitted to the GPU 134 and stored within GPU memory 120 as the compressed difference image 126. The compressed difference image 126 may then be used to either perform an undo or redo operation, as discussed above.

The technique described herein has an advantageous property of being relatively independent of the natural flow of the software graphics application 112. That is, the GPU 134 performs each action requested by the software graphics application 112 with relatively little overhead added to the software graphics application 112 in order to prepare for a possible undo or redo request. Furthermore, each undo or redo request is performed by the GPU 134 on the current image with relatively little overhead added to the software graphics application 112.

Figure 2A:
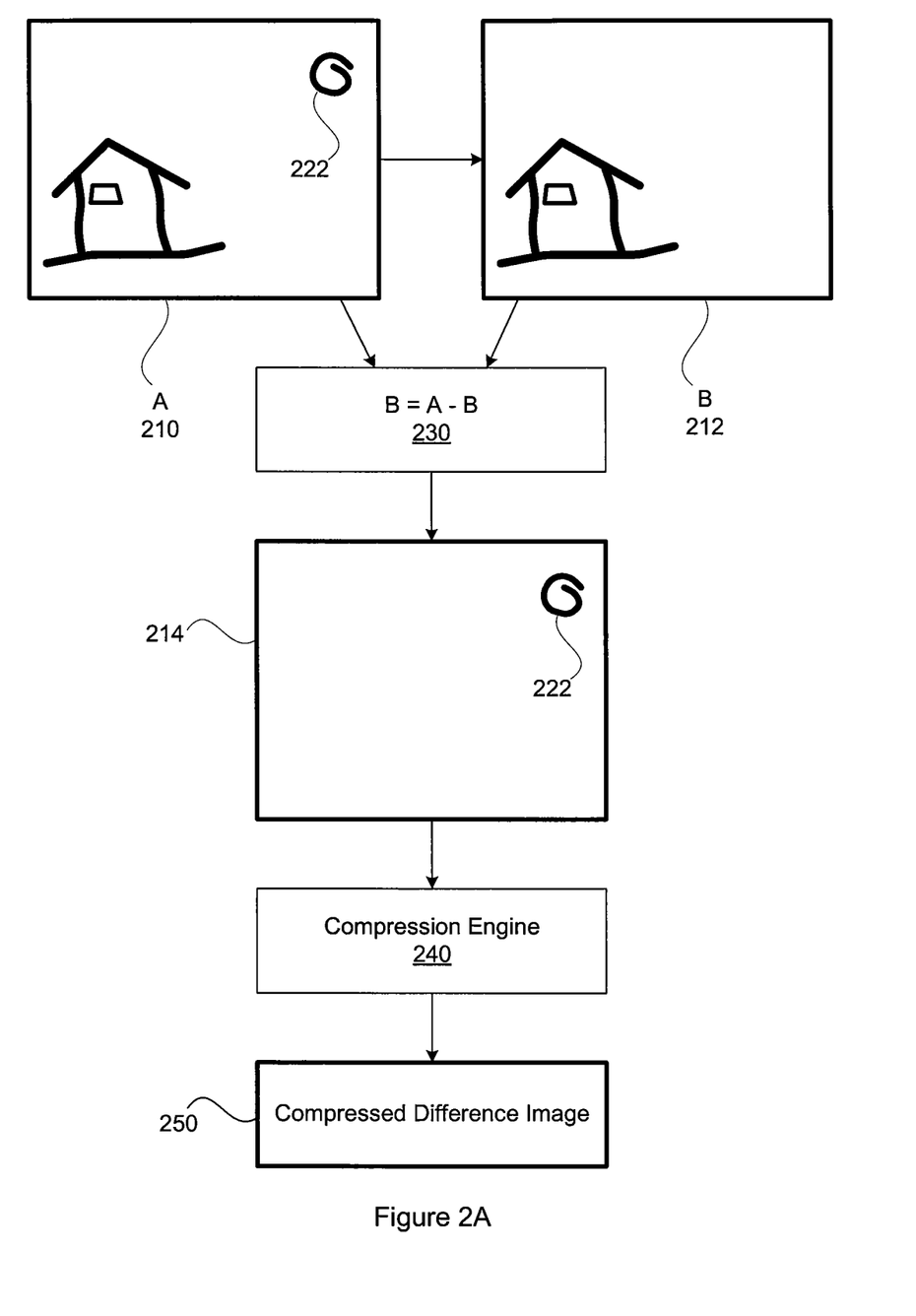
FIG. 2A illustrates a technique for generating a compressed difference image, according to one embodiment of the invention.

FIG. 2A illustrates a technique for generating a compressed difference image 250, according to one embodiment of the invention. Image buffers A 210 and B 212 are used by the GPU 134 of FIG. 1 to store images in the GPU memory 120. Image buffer A 210 and image buffer B 212 may correspond to image buffer A 122 and image buffer B 124, respectively. The compressed difference image 250 may correspond to compressed image buffer 126.

Prior to performing a specified action, image buffer A 210 may be copied to image buffer B 212. After the copy is complete, the specified action may be performed in image buffer A 210. In this scenario, the action is a brush stroke to paint the circular object 222 in image buffer A 210. At this point, image buffer B 212 stores the pre-action version of the image being edited by the user, and image buffer A 210 stores the post-action version of the image. After the action is performed on image buffer A 210, a difference image 214 may be generated by a difference engine 230, configured to subtract image buffer B 212 from image buffer A 210. In one embodiment, image buffer B is used to store the difference image 214. Furthermore, the difference engine 230 may assign each region, such as a scan line, within image buffers A 210 and B 212 to one or more threads for processing by the GPU 134. As shown, the difference image 214 includes mostly zeros, indicating no difference between the pre-action and post-action images. The non-zero pixels within the difference image 214 represent the most recent action taken by the user. In this scenario, one action performed by the user is represented by non-zero pixel difference values forming the circular object 222. Additional actions may be represented with a suitable granularity for performing undo actions within the software graphics application 112. The difference image 214 is compressed by a compression engine 240 to generate the compressed difference image 250. The compression engine 240 may employ any technically feasible technique suitable for execution on the GPU 134. In one embodiment, a run-length encoder comprises the compression engine 240, where each region, such as a scan line, of the difference image 214 is assigned to a thread within the GPU 134.

Figure 2B:
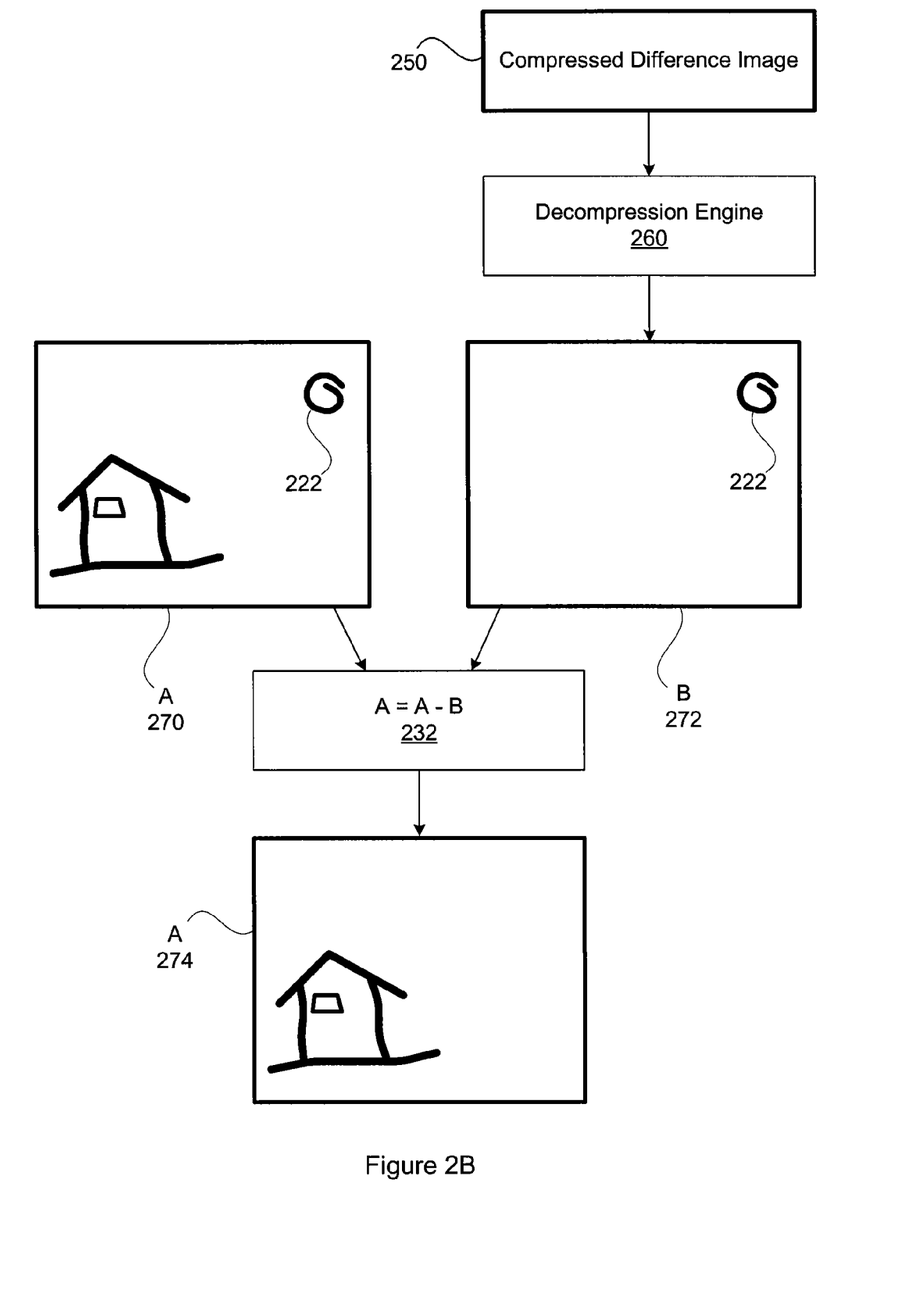
FIG. 2B illustrates a technique for using a compressed difference image to perform an undo operation, according to one embodiment of the invention.

FIG. 2B illustrates a technique for using the compressed difference image 250 to perform an undo operation, according to one embodiment of the invention. Image buffer A 270 and image buffer B 272 may correspond to image buffer A 122 and image buffer B 124, respectively. The compressed difference image 250 may correspond to compressed image buffer 126.

The undo operation may be performed by subtracting the most recent difference image, stored as the compressed difference image 250, from the current image, which is stored in image buffer A 270. The compressed difference image 250 is first decompressed by the decompression engine 260 to generate the difference image stored in image buffer B 272. In one embodiment, the decompression engine 260 implements a run-length decoder. In a refinement of this embodiment, each region, such as a scan line, within the compressed difference image 250 is assigned to at least one thread within the GPU 134 for processing. For example, an image comprising 1024 scan lines may be assigned to 1024 simultaneously executing threads to perform run-length decoding and decompression.

As depicted, subtracting image buffer B 272 from image buffer A 270 is equivalent to performing an undo operation on the brush stroke that added the circular object 222 to the previous image. In one embodiment, the subtraction engine 232 stores the resulting post-undo image in image buffer A 274. Furthermore, the subtraction engine 232 may assign each region, such as a scan line, within image buffers A 270 and B 272 to one or more threads for processing by the GPU 134.

Figure 2C:
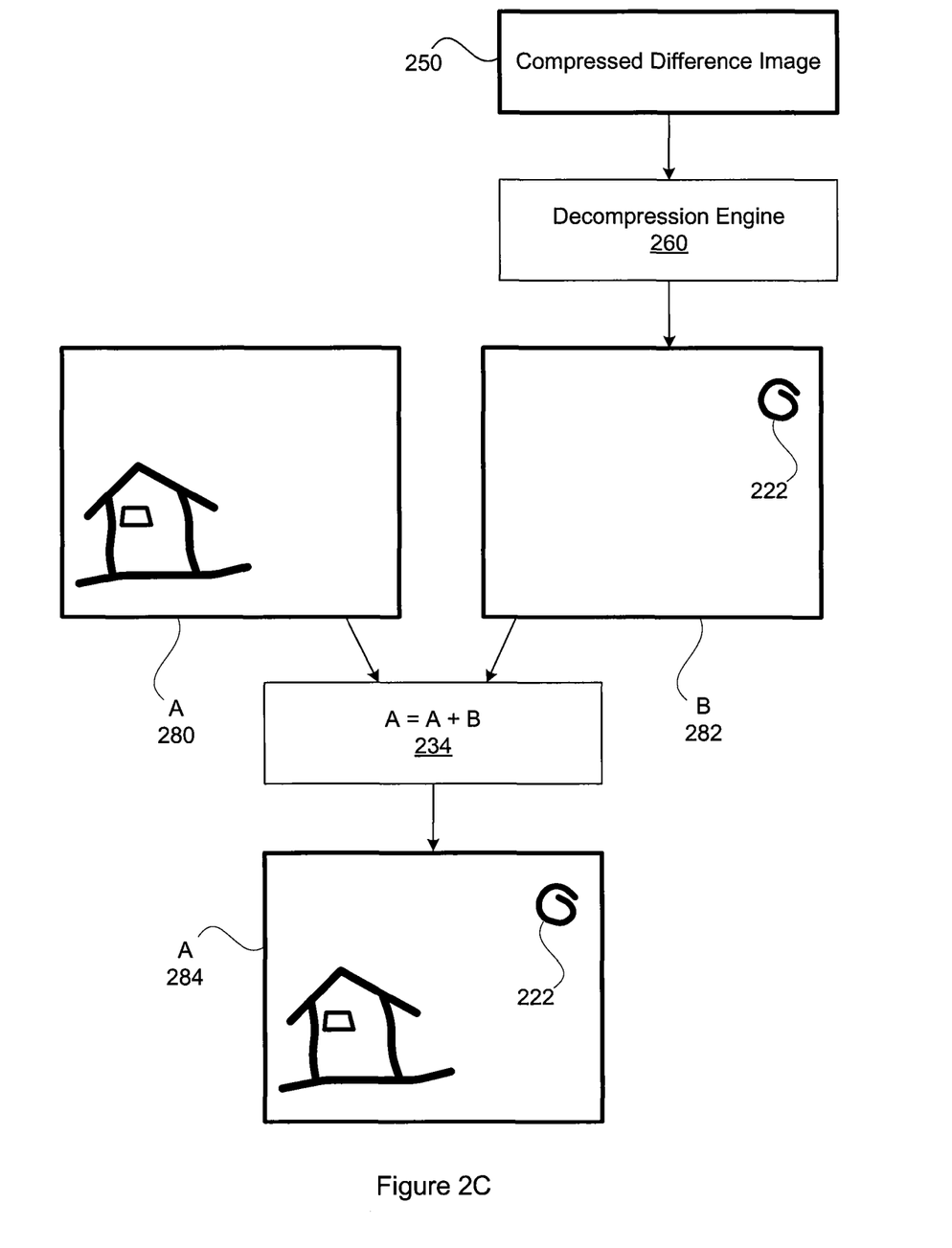
FIG. 2C illustrates a technique for using a compressed difference image to perform a redo operation, according to one embodiment of the invention.

FIG. 2C illustrates a technique for using the compressed difference image 250 to perform a redo operation, according to one embodiment of the invention. Image buffer A 280 and image buffer B 282 may correspond to image buffer A 122 and image buffer B 124, respectively. The compressed difference image 250 may correspond to compressed image buffer 126.

The redo operation may be performed by adding a subsequent difference image, stored as the compressed difference image 250, to the current image, stored in image buffer A 280. The compressed difference image 250 is first decompressed by the decompression engine 260 to generate the difference image stored in image buffer B 282. In one embodiment, the decompression engine 260 implements a run-length decoder. In a refinement of this embodiment, each region, such as a scan line, within the compressed difference image 250 is assigned to at least one thread within the GPU 134 for processing. For example, an image comprising 1024 scan lines may be assigned to 1024 simultaneously executing threads to perform run-length decoding and decompression.

As depicted, adding image buffer B 282 to image buffer A 280 is equivalent to performing a redo operation on the brush stroke that adds the circular object 222 to the current image, stored in image buffer A 280. In one embodiment, the addition engine 234 stores the resulting post-redo image in image buffer A 284. Furthermore, the addition engine 234 may assign each region, such as a scan line, within image buffers A 280 and B 282 to one or more threads for processing by the GPU 134.

Figure 3:
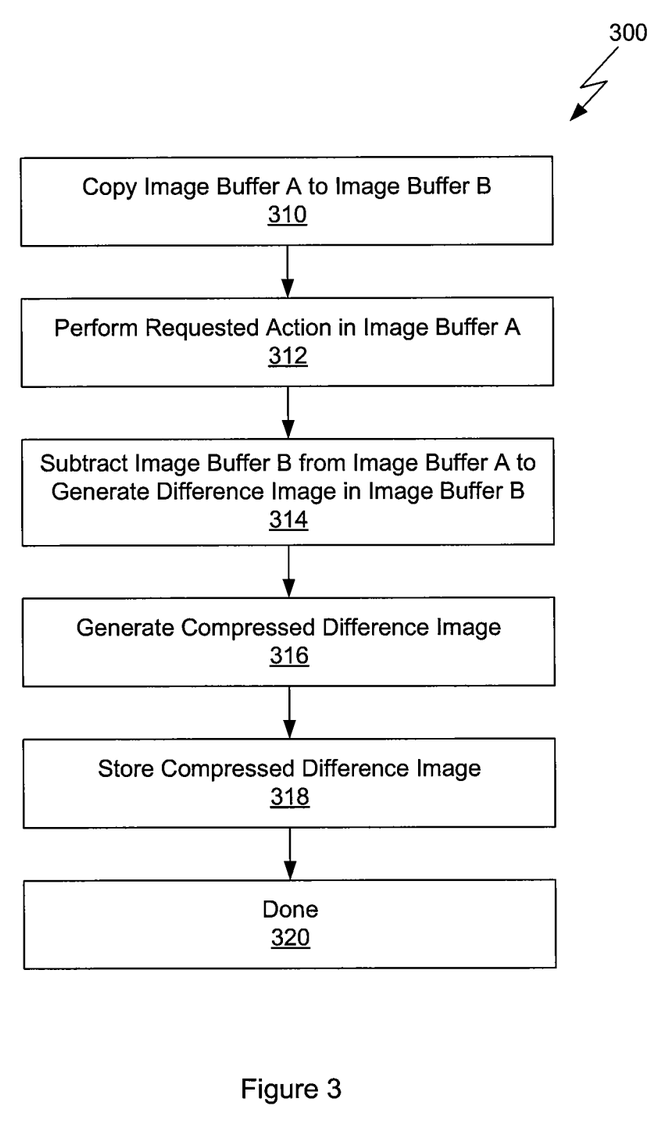
FIG. 3 is a flow diagram of method steps for generating a difference image, according to one embodiment of the invention.

FIG. 3 is a flow diagram of method steps 300 for generating a difference image, according to one embodiment of the invention. Although the method steps are described in conjunction with the system of FIG. 1, persons skilled in the art will understand that any system configured to perform the method steps, in any order, is within the scope of the invention.

The method begins in step 310, where the GPU 134 copies the contents of image buffer A to image buffer B. In step 312, the GPU 134 performs a requested action that modifies the contents of image buffer A. For example, the GPU 134 may render a paintbrush stroke into image buffer A. In step 314, the GPU 134 generates a difference image by subtracting image buffer B from image buffer A. In one embodiment, the resulting difference image is stored in image buffer B. In step 316, the GPU 134 generates a compressed difference image from the difference image.

In step 318, the compressed difference image is stored for later use. In one embodiment, the compressed difference image is transmitted through the memory bridge 132 and stored in system memory 110. In an alternative embodiment, the compressed difference image is stored in GPU memory 120. The method terminates in step 320.

Figure 4:
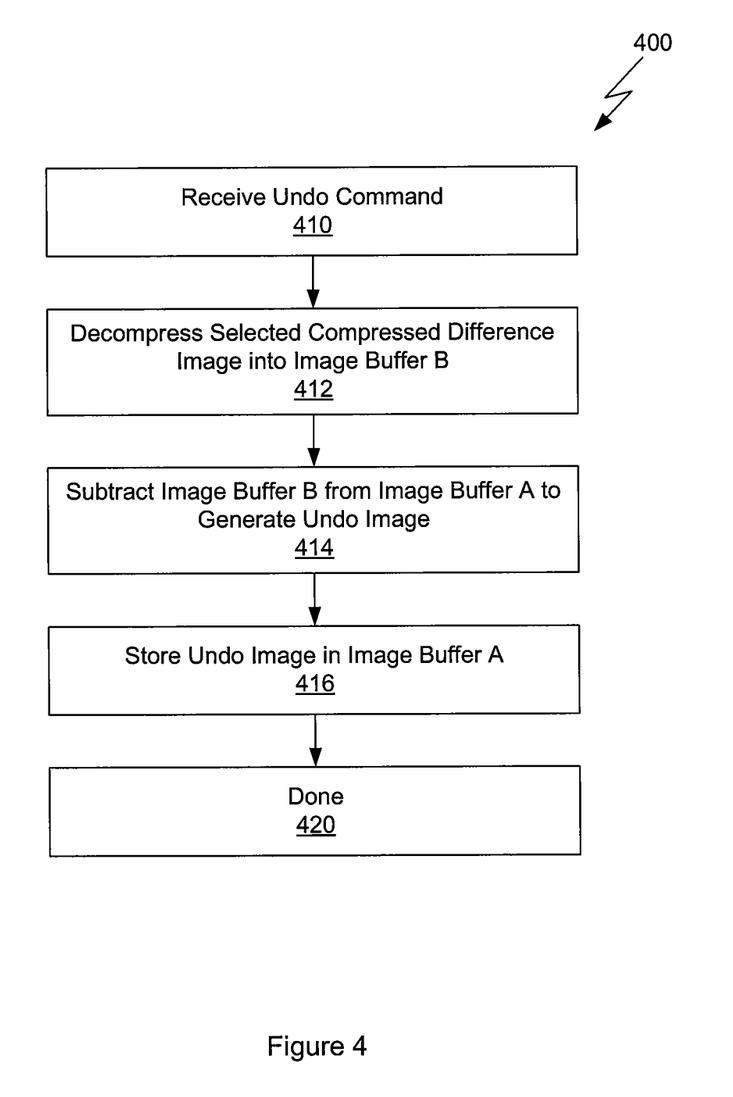
FIG. 4 is a flow diagram of method steps for performing an undo operation, according to one embodiment of the invention.

FIG. 4 is a flow diagram of method steps 400 for performing an undo operation, according to one embodiment of the invention. Although the method steps are described in conjunction with the system of FIG. 1, persons skilled in the art will understand that any system configured to perform the method steps, in any order, is within the scope of the invention.

The method begins in step 410, where the GPU 134 is instructed to perform an undo command. The undo command may include references to image buffers. The undo command may also include a reference to a selected compressed difference image. In step 412, the GPU 134 decompresses the selected compressed difference image buffer into image buffer B. In step 414, the GPU 134 subtracts image buffer B from the current image, stored in image buffer A, to generate an undo image. In step 416, the resulting undo image is stored in image buffer A. The method terminates in step 420.

Figure 5:
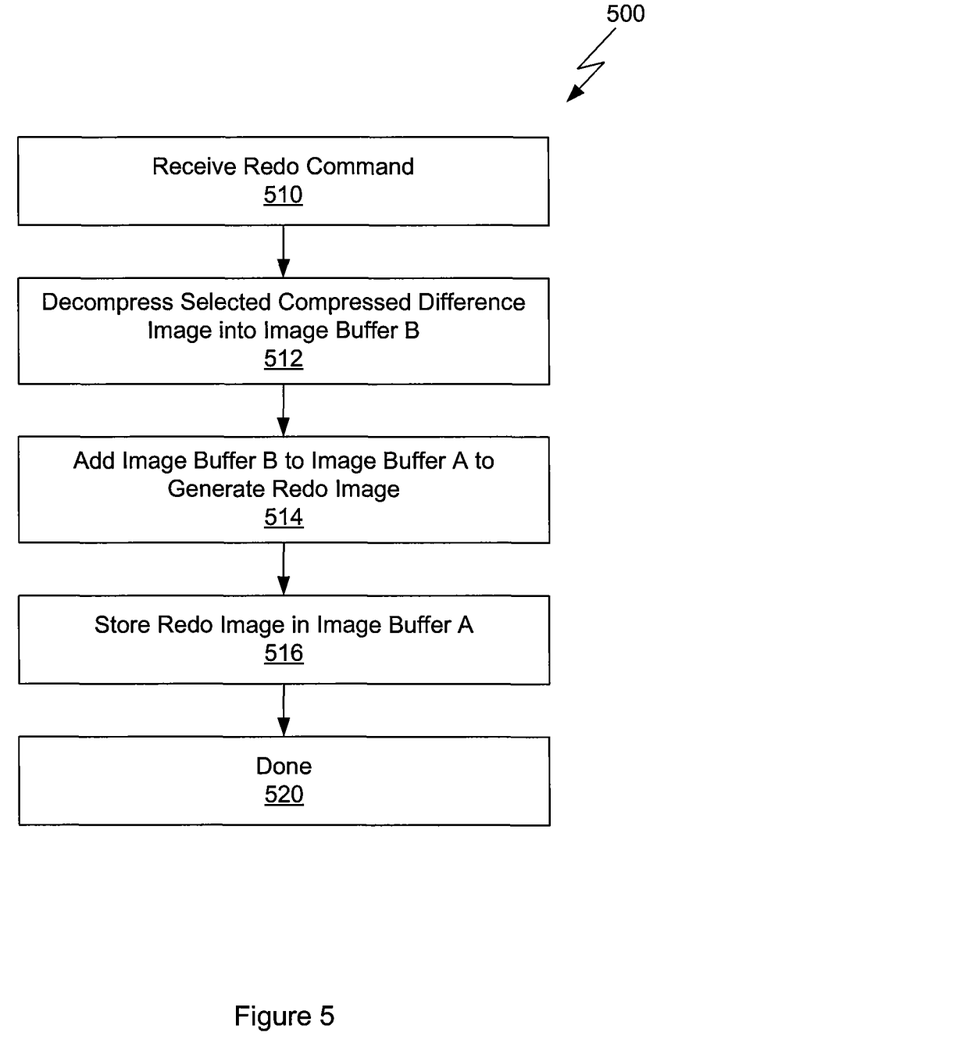
FIG. 5 is a flow diagram of method steps for performing a redo operation, according to one embodiment of the invention.

FIG. 5 is a flow diagram of method steps 500 for performing a redo operation, according to one embodiment of the invention. Although the method steps are described in conjunction with the system of FIG. 1, persons skilled in the art will understand that any system configured to perform the method steps, in any order, is within the scope of the invention.

The method begins in step 510, where to GPU 134 is instructed to perform a redo command. The redo command may include references to image buffers. The redo command may also include a reference to a selected compressed difference image. In step 512, the GPU 134 decompresses the selected compressed difference image buffer into image buffer B. In step 514, the GPU 134 adds image buffer B to the current image, stored in image buffer A, to generate a redo image. In step 516, the resulting redo image is stored in image buffer A. The method terminates in step 520.

In sum, a method for efficiently performing undo and redo operations on a GPU is disclosed. The GPU copies a first image buffer to a second image buffer prior to performing a requested action that modifies the first image buffer. After performing the requested action in the first image buffer, the GPU subtracts the second image buffer from the first image buffer to generate a difference image that represents only the changes made to the image as a result of the requested action. That is, the difference image represents the difference between the current image and an undo image, which represents the current image after an undo operation is applied. The difference image is compressed for efficient storage and transmission between different system components, such as a GPU memory and a system memory. In one embodiment, run-length encoding is used to compress the difference image. A sequence of compressed difference images may be used to generate multiple levels of undo operations. The difference images may also be used to perform a redo command. One advantage of the present invention is that the data storage and transmission requirements are minimized by advantageously compressing differences between each version of an image.

The foregoing embodiment describes a specific example of modifying images resident on the GPU. This invention also applies equally well to vertex data describing a 3D shape to be drawn, or to any other data to be modified or computed using the GPU. This invention is advantageous any time there is data being modified or computed in GPU memory where undo and redo is required, and where each modification tends to affect a relatively small portion of the data in any given undoable step. Persons skilled in the art will recognize that the disclosed technique may be applied to any data associated with an undo and redo operation without departing from the scope of this invention.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

I claim:

1. A method for generating a compressed difference buffer, the method comprising:
copying a first buffer to a second buffer;
modifying the first buffer to generate a modified first buffer;
subtracting the second buffer from the modified first buffer to generate a difference buffer;
compressing the difference buffer to generate a compressed difference buffer;
storing the compressed difference buffer;
receiving an undo command;
decompressing the compressed difference buffer to regenerate the difference buffer; and
subtracting the regenerated difference buffer from the modified first buffer to generate an undo buffer.

2. The method of claim 1, wherein the buffers include texture data, vertex data or geometry data.

3. The method of claim 1, wherein the buffers include image data.

4. The method of claim 3, wherein the step of subtracting the second buffer from the modified first buffer comprises subtracting each color channel of each pixel in the second buffer from a corresponding color channel of a corresponding pixel in the modified first buffer.

5. The method of claim 1, wherein the step of subtracting the second buffer from the modified first buffer is performed by a plurality of threads, and each thread in the plurality of threads is assigned to a different region of the modified first buffer and corresponding region of the second buffer.

6. The method of claim 5, wherein the step of compressing the difference buffer is performed by a plurality of threads, and each thread in the plurality of threads is assigned to a different region of the modified first buffer and a corresponding region of the second buffer.

7. The method of claim 6, wherein the step of compressing the difference buffer comprises performing a run-length encoding operation on the difference buffer.

8. The method of claim 7, wherein the step of storing the compressed difference buffer comprises transmitting the compressed difference buffer from a first memory subsystem to a second memory subsystem.

9. The method of claim 1, wherein the step of decompressing the compressed difference buffer comprises performing a run-length decoding operation on the compressed difference buffer.

10. The method of claim 9, further comprising the steps of:
receiving a redo command; and
adding the regenerated difference buffer to the undo buffer to generate a redo buffer.

11. The method of claim 10, wherein the step of adding the regenerated difference buffer to the undo buffer is performed by a plurality of threads, and each thread is assigned to a different region of the regenerated difference buffer and a corresponding region of the undo buffer.

12. A computer-readable medium including instructions that, when executed by a processing unit, cause the processing unit to generate a compressed difference buffer, by performing the steps of:
copying a first buffer to a second buffer;
modifying the first buffer to generate a modified first buffer;
subtracting the second buffer from the modified first buffer to generate a difference buffer;
compressing the difference buffer to generate a compressed difference buffer;
storing the compressed difference buffer;
receiving an undo command;
decompressing the compressed difference buffer to regenerate the difference buffer; and
subtracting the regenerated difference buffer from the modified first buffer to generate an undo buffer.

13. The computer-readable medium of claim 12, wherein the buffers include texture data, vertex data or geometry data.

14. The computer-readable medium of claim 12, wherein the buffers include image data.

15. The computer-readable medium of claim 14, wherein the step of subtracting the second buffer from the modified first buffer comprises subtracting each color channel of each pixel in the second buffer from a corresponding color channel of a corresponding pixel in the modified first buffer.

16. The computer-readable medium of claim 12, wherein the step of subtracting the second buffer from the modified first buffer is performed by a plurality of threads, and each thread in the plurality of threads is assigned to a different region of the modified first buffer and corresponding region of the second buffer.

17. The computer-readable medium of claim 16, wherein the step of compressing the difference buffer is performed by a plurality of threads, and each thread in the plurality of threads is assigned to a different region of the modified first buffer and a corresponding region of the second buffer.

18. The computer-readable medium of claim 17, wherein the step of compressing the difference buffer comprises performing a run-length encoding operation on the difference buffer.

19. The computer-readable medium of claim 18, wherein the step of storing the compressed difference buffer comprises transmitting the compressed difference buffer from a first memory subsystem to a second memory subsystem.

20. The computer-readable medium of claim 12, wherein the step of decompressing the compressed difference buffer comprises performing a run-length decoding operation on the compressed difference buffer.

21. The computer-readable medium of claim 20, further comprising the steps of:
  receiving a redo command; and
  adding the regenerated difference buffer to the undo buffer to generate a redo buffer.

22. The computer-readable medium of claim 21 wherein the step of adding the regenerated difference buffer to the undo buffer is performed by a plurality of threads, and each thread is assigned to a different region of the regenerated difference buffer and a corresponding region of the undo buffer.

* * * * *